United States Patent
Lee et al.

(10) Patent No.: US 10,705,661 B2
(45) Date of Patent: Jul. 7, 2020

(54) TOUCH DEVICE

(71) Applicant: HannStar Display Corporation, Taipei (TW)

(72) Inventors: Hsing-Ying Lee, Tainan (TW); Cheng-Yen Yeh, Taichung (TW); Wei-Chih Hsu, Taichung (TW)

(73) Assignee: HannStar Display Corporation, Taipei (TW)

( * ) Notice: Subject to any disclaimer, the term of this patent is extended or adjusted under 35 U.S.C. 154(b) by 0 days.

(21) Appl. No.: 16/177,471

(22) Filed: Nov. 1, 2018

(65) Prior Publication Data

US 2019/0138129 A1    May 9, 2019

(30) Foreign Application Priority Data

Nov. 9, 2017 (CN) .......................... 2017 1 1096409

(51) Int. Cl.
*G06F 3/044* (2006.01)
*G06F 3/041* (2006.01)

(52) U.S. Cl.
CPC ............ *G06F 3/044* (2013.01); *G06F 3/0443* (2019.05); *G06F 3/0448* (2019.05); *G06F 3/0412* (2013.01); *G06F 2203/04112* (2013.01)

(58) Field of Classification Search
None
See application file for complete search history.

(56) References Cited

U.S. PATENT DOCUMENTS

| | | | |
|---|---|---|---|
| 2013/0063371 A1* | 3/2013 | Lee .................... | G06F 3/044 345/173 |
| 2014/0043252 A1* | 2/2014 | Kim .................... | G06F 3/041 345/173 |

* cited by examiner

*Primary Examiner* — Parul H Gupta
(74) *Attorney, Agent, or Firm* — JCIPRNET

(57) ABSTRACT

A touch device including a plurality of touch electrodes which are electrically separated is provided. Each touch electrode includes a plurality of first curved patterns and a plurality of conductive lines. The first curved patterns are parallel to each other. A first pitch is between two adjacent first curved patterns. Each conductive line is connected between two adjacent first curved patterns. The conductive lines are arranged in a plurality of second curved patterns. The first curved patterns intersect the second curved patterns. In this way, the touch device can have preferable touch and visual effects.

20 Claims, 6 Drawing Sheets

TOUCH DEVICE

CROSS-REFERENCE TO RELATED APPLICATION

This application claims the priority benefit of China application serial no. 201711096409.8, filed on Nov. 9, 2017. The entirety of the above-mentioned patent application is hereby incorporated by reference herein and made a part of this specification.

BACKGROUND

Field of the Invention

The invention is directed to an electronic device and more particularly, to a touch device.

Description of Related Art

Touch devices can be substantially classified into a resistive type, a capacitive type, an optical type, a sonic type and an electromagnetic type according to different touch sensing manners. A capacitive type touch device, due to having advantages, such as quick touch response time, good reliability and high durability, has been widely applied in various electronic products.

According to different structures and manufacturing methods, the capacitive type touch device may further be classified into two types, i.e., an added-on type and an on-cell/in-cell type. The touch device, not matter whether being an added-on, an on-cell or an in-cell type, includes a plurality of touch electrodes, and gaps exist between the touch electrodes, thereby electrically separating the touch electrodes from each other. In the current technique, as a transmittance at which the gaps are located is different from a transmittance at which the touch electrodes are located, a user may easily perceive the disposition of the touch electrodes, which affects a visual effect of the touch device. In order to improve the issue, some people may dispose slits having the same or similar shape of the gaps inside the touch electrodes, thereby preventing the existence of the touch electrodes from being perceived by human eyes. However, the disposition of the slits may cause an impendence of the touch electrodes to be increased, which is unfavorable for a touch effect of the touch device.

SUMMARY

The invention provides a touch device having preferable touch and visual effects.

A touch device of the invention includes a plurality of touch electrodes which are electrically separated from each other. Each of the touch electrodes includes a plurality of first curved patterns and a plurality of conductive lines. The first curved patterns are parallel to each other. A first pitch is between two adjacent first curved patterns. Each of the conductive lines is connected between two adjacent first curved patterns. The conductive lines are arranged in a plurality of second curved patterns. The first curved patterns intersect the second curved patterns.

In an embodiment of the invention, each of the first curved patterns comprises a plurality of first repeating portions connected with each other, each of the first repeating portions has a first length $P_{1y}$ in a first direction, each of the second curved patterns includes a plurality of second repeating portions, each of the second repeating portions has a second length $P_{2x}$ in a second direction intersecting the first direction, and $3 \cdot P_{1y} \leq P_{2x} \leq 6 \cdot P_{1y}$.

In an embodiment of the invention, the conductive lines of each of the second curved patterns includes a plurality of first conductive lines and a plurality of second conductive lines. The first conductive lines are arranged along a third direction. The second conductive lines are arranged along a fourth direction. The third direction intersects the fourth direction, the third direction and the fourth direction have an included angle θ, and $130° \leq θ \leq 170°$.

In an embodiment of the invention, each of the first curved patterns includes a plurality of first repeating portions connected with each other, each of the first repeating portions has a first length $P_{1y}$ in a first direction, the second curved patterns are separated from each other in the first direction, a second pitch $P_{2y}$ is between two adjacent second curved patterns, and $3 \cdot P_{1y} \leq P_{2y} \leq 6 \cdot P_{1y}$.

In an embodiment of the invention, the second curved patterns are separated from each other in a first direction, a second pitch $P_{2y}$ is between two adjacent second curved patterns, each of the second curved patterns includes a plurality of second repeating portions, each of the second repeating portions has a second length $P_2$, in a second direction intersecting the first direction, and $P_{2y} = P_{2x}$.

In an embodiment of the invention, each of the conductive lines has a line width W1, and $W1 \leq 30$ μm.

In an embodiment of the invention, the second curved patterns are separated from each other in a first direction, the first curved patterns define a plurality of first curved slits and a plurality of second curved slits, and the first curved slits and the second curved slits are alternately arranged in a second direction intersecting the first direction, wherein the conductive lines of two adjacent second curved patterns are respectively arranged in the first curved slits and the second curved slits.

In an embodiment of the invention, the second curved patterns are separated from each other in the first direction, and the first curved patterns define a plurality of curved slits, wherein the corresponding conductive lines of two adjacent second curved patterns are arranged in a single curved slit.

In an embodiment of the invention, each of the touch electrodes further includes a third curved pattern. The third curved pattern is parallel to the second curved patterns. The third curved pattern the third curved pattern defines an edge of each of the touch electrodes and is a continuous pattern.

In an embodiment of the invention, a plurality of closed curved slits are surrounded by the first curved patterns, the conductive lines and the third curved pattern.

In an embodiment of the invention, each of the first curved patterns and/or each of the second curved patterns present a sawtooth shape.

In an embodiment of the invention, each of the first curved patterns includes a plurality of first repeating portions connected with each other, each of the first repeating portions has a first length $P_{1y}$ in a first direction, each of the second curved patterns includes a plurality of second repeating portions, each of the second repeating portions has a second length $P_{2x}$ in a second direction intersecting the first direction, and each of the first repeating portions and/or each of the second repeating portions present a dog-leg shape.

In an embodiment of the invention, a touch sensing manner of the touch device is capacitive sensing.

In an embodiment of the invention, the touch device further includes a display panel. The touch electrodes are disposed on the display panel.

In an embodiment of the invention, the touch device further includes a protection substrate. The touch electrodes are disposed on the protection substrate.

In an embodiment of the invention, the touch device further includes a protection substrate and a display panel. The touch electrodes are disposed between the protection substrate and the display panel.

In an embodiment of the invention, the touch device further includes a touch substrate. The touch electrodes are disposed between the protection substrate and the touch substrate. The protection substrate, the touch electrodes and the touch substrate form a touch panel, and the touch panel is disposed on the display panel.

Based on the above, the touch device of one of the embodiments of the invention includes the touch electrodes which are electrically separated from each other. Each of the touch electrodes includes the first curved patterns and the conductive lines. The first curved patterns are parallel to each other. The first pitch is between two adjacent first curved patterns. Each of the conductive lines are connected between two adjacent first curved patterns. With the plurality of conductive lines, the impendence of the touch electrodes can be reduced. Specially, the conductive lines are arranged in the second curved patterns, and the first curved patterns intersect the second curved patterns. In this way, the disposition of the conductive lines can be prevented from being perceived by human eyes, such that the touch device can achieve preferable touch and visual effects.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
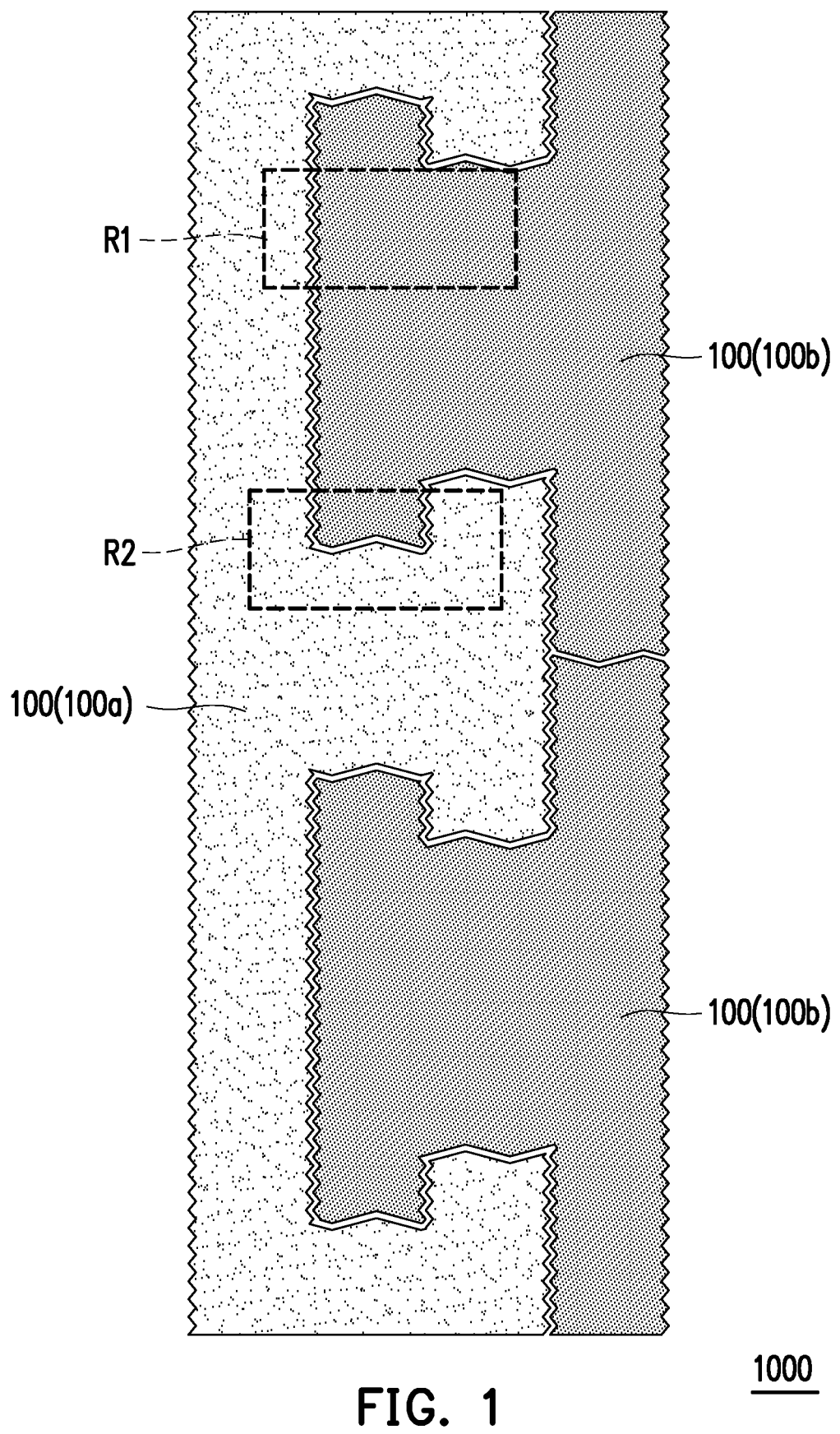
FIG. 1 is a schematic top view of a touch device according to an embodiment of the invention.

FIG. 1 is a schematic top view of a touch device according to an embodiment of the invention. Referring to FIG. 1, a touch device 1000 includes a plurality of touch electrodes 100 which are electrically separated from each other. In the present embodiment, the touch electrodes 100 include adjacent first the touch electrode 100a and second the touch electrode 100b. The first the touch electrode 100a may be a transmission electrode (Tx), and the second the touch electrode 100b may be a reception electrode (Rx). A sensing manner of the first the touch electrode 100a and the second the touch electrode 100b is, for example, a capacitive sensing manner. The capacitive sensing manner may be a self-capacitance sensing mode or a mutual-capacitance sensing mode. The first the touch electrode 100a and the second the touch electrode 100b may be in a one transmitter-one receiver (1T1R) architecture, one transmitter-two receiver (1T2R) architecture, one transmitter-three receiver (1T3R) architecture or other adaptive architectures. For example, 1T2R refers to one first the touch electrodes 100a corresponding to two second touch electrodes 100b, and after a driving signal is provided to the first the touch electrode 100a, the two corresponding second touch electrodes 100b respectively output sensing signals to an integrated circuit for signal processing. Similarly, 1T3R refers to one first the touch electrode 100a corresponding to three second touch electrodes 100b, and after a driving signal is provided to the first the touch electrode 100a, the corresponding second touch electrodes 100b respectively output sensing signals to an integrated circuit for signal processing. For example, in the present embodiment, the first the touch electrode 100a may present an E-shape, and the second the touch electrode 100b may present an H-shaped, but the invention is not limited thereto. In other embodiments, the first touch electrode 100a and/or second the touch electrode 100b may also present other adaptive shapes, such as a triangular shape, a rhombic shape and so on.

Figure 2:
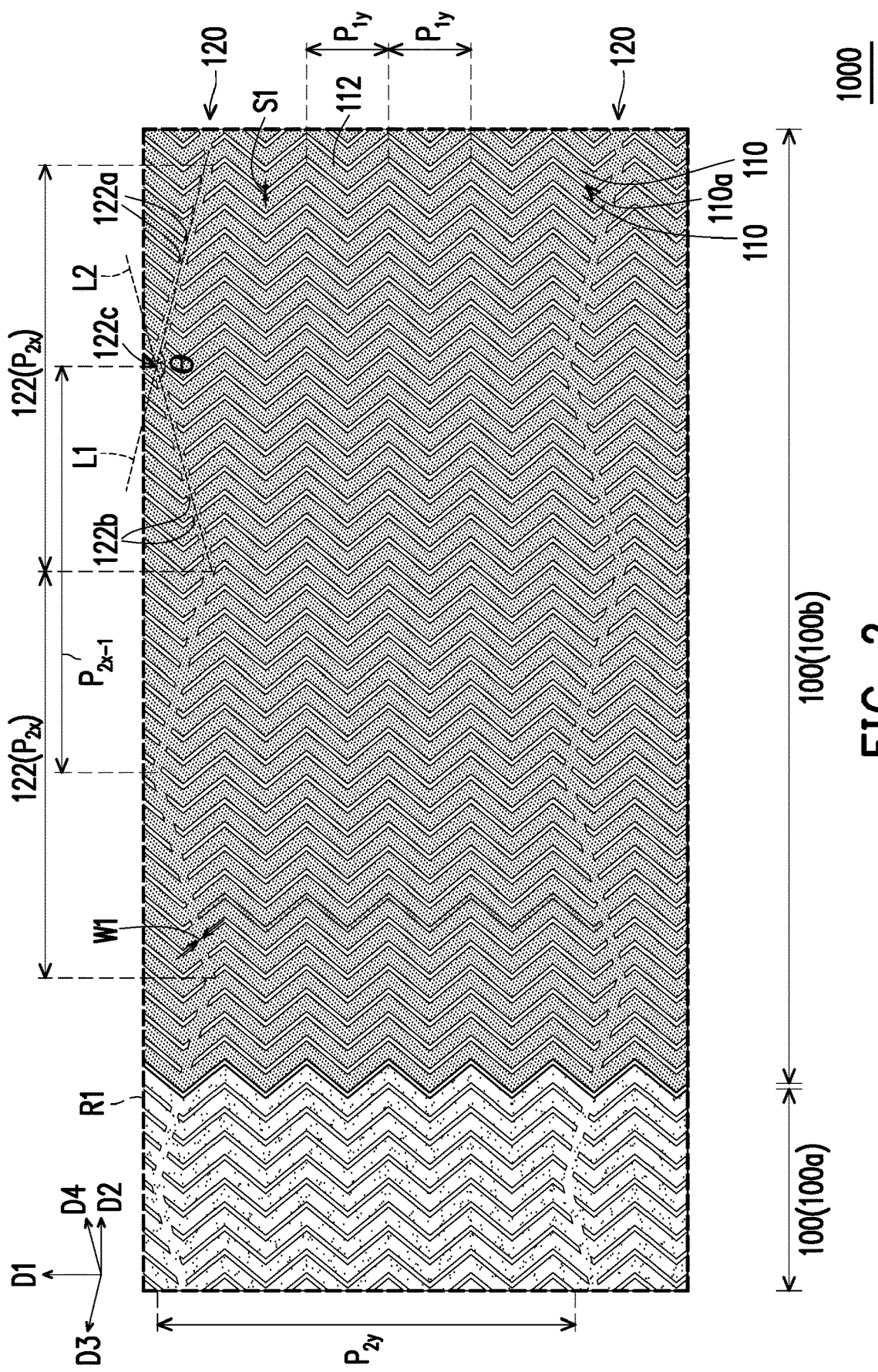
FIG. 2 is a schematic enlarged view of a part R1 of FIG. 1.

FIG. 2 is a schematic enlarged view of a part R1 of FIG. 1. Referring to FIG. 2, each of the touch electrodes 100 includes a plurality of first curved patterns 110. The first curved patterns 110 are parallel to each other. A first pitch S1 is between two adjacent first curved patterns 110. In other words, the touch electrodes 100 have a plurality of curved slits 110a, each of the curved slits 110a is defined by two adjacent first curved patterns 110, and the first pitch S1 may refer to a width of the each of the curved slits 110a in a second direction D2. In the present embodiment, each of the first curved patterns 110 may present a sawtooth shape, but the invention is not limited thereto. In other embodiments, the first curved patterns 110 may present other adaptive shapes.

Referring to FIG. 2, each of the first curved patterns 110 may include a plurality of first repeating portions 112 connected with each other, each of the first repeating portions 112 has a first length $P_{1y}$ in a first direction D1. For example, in the present embodiment, each of the first repeating portions 112 may be a dog-leg shaped pattern, and the first length $P_{1y}$ may refer to a distance between an upper end and a lower end of the dog-leg shaped pattern. However, the invention is not limited thereto, and in other embodiments, the first repeating portions 112 may also have other adaptive shapes.

Each of the touch electrodes 100 further includes a plurality of conductive lines 122a and 122b. Each of the conductive lines 122a or 122b is connected between two adjacent first curved patterns 110. Specifically, each of the conductive lines 122a or 122b is electrically connected between two adjacent first curved patterns 110 of the same touch electrode 100 to reduce an impendence of the touch electrode 100. It should be noted that the conductive lines 122a and 122b are arranged in a plurality of second curved patterns 120, at least one of the second curved patterns 120 and at least one of the first curved patterns 110 are connected with and adjacent to each other. In this way, while the impendence is reduced by using the conductive lines 122a and 122b, the disposition of the conductive lines 122a and 122b is not easily perceived by human eyes, such that the touch device 1000 may have preferable touch and visual effects.

For example, in the present embodiment, a plurality of conductive lines 122a and 122b may be arranged along a sawtooth-shaped edge to form the second curved patterns 120 in a sawtooth shape. Each of the second curved patterns 120 includes a plurality of second repeating portions 122. In the present embodiment, each of the second repeating portions 122 may be a dog-leg shaped pattern. Specifically, taking FIG. 2 as an example, each of the second repeating portions 122 may be a dog-leg shaped pattern clockwise rotating by 90°, a dog-leg shaped pattern counterclockwise rotating by 90° or a dog-leg shaped pattern rotating by an adaptive angle. However, the invention is not limited thereto, and in other embodiments, the second repeating portions 122 may also have other adaptive shapes.

In the present embodiment, the arrangement of the conductive lines 122a and 122b (or referred to as the type of the second curved patterns 120 and/or the second repeating portions 122) may be specifically designed to achieve optimization of the visual effect of the touch device 1000. For example, in the present embodiment, each of the second repeating portions 122 has a second length $P_{2x}$ in the second direction D2 intersecting the first direction D1, and $3 \cdot P_{1y} \leq P_{2x} \leq 6 \cdot P_{1y}$. In other words, the length $P_{2x}$ of each of the second repeating portions 122 may be much greater than the length $P_{1y}$ of the first repeating portions 112, thereby preventing the disposition of the second repeating portions 122 (or the conductive lines 122a and 122b) from being perceived by the human eyes.

In the present embodiment, the conductive lines 122a and 122b of each of the second repeating portions 122 include a plurality of first conductive lines 122a arranged along a third direction D3 and a plurality of second conductive lines 122b arranged along a fourth direction D4. Each of the first conductive lines 122a arranged along the third direction D3 overlaps a first reference line L1, each of the second conductive lines 122b arranged along the fourth direction D4 overlaps a second reference line L2, the first reference line L1 and the second reference line L2 intersect at an end point 122c, and the length $P_{2x}$ of each of the second repeating portions 122 may be equal to a distance ($P_{2x-1}$) between two end points 122c of two adjacent second repeating portions 122. In the present embodiment, the first reference line L1 and the second reference line L2 are, for example, straight lines, but the invention is not limited thereto, and in other embodiments, the first reference line L1 and the second reference line L2 may also be arc lines or other lines in adaptive shapes.

In the present embodiment, an angle θ of each of the second repeating portions 122 may also be specially designed. Specifically, the conductive lines 122a and 122b of each of the second repeating portions 122 include the first conductive lines 122a arranged along the third direction D3 and the second conductive lines 122b arranged along the fourth direction D4, where the third direction D3 and the fourth direction D4 are not parallel to the first direction D1 and the second direction D2, the third direction D3 intersects the fourth direction D4, the angle θ is between the third direction D3 and the fourth direction D4, and $130° \leq θ \leq 170°$. In other words, the angle θ of each of the second repeating portions 122 may be a great obtuse angle, thereby preventing the disposition of the second repeating portions 122 (or the conductive lines 122a and 122b) from being perceived by the human eyes.

In the present embodiment, the second curved patterns 120 are separated from each other in the first direction D1, and a second pitch $P_{2y}$ is between two adjacent second curved patterns 120. For example, in the present embodiment, two second repeating portions 122 respectively belonging to two adjacent second curved patterns 120 may be aligned with each other in the first direction D1, and the second pitch $P_{2y}$ may refer to the distance between two end points 122c of each of the aforementioned two second repeating portions 122. In the present embodiment, each of the first curved patterns 110 includes a plurality of first repeating portions 112 connected with each other, each of the first repeating portions 112 has the first length $P_{1y}$ in the first direction D1, the second pitch $P_{2y}$ is between two adjacent second curved patterns 120, and $3 \cdot P_{1y} \leq P_{2y} \leq 6 \cdot P_{1y}$. In other words, the second pitch $P_{2y}$ between two adjacent second curved patterns 120 is not too small to cause the second curved patterns 120 to be perceived by the human eyes, while the second pitch $P_{2y}$ between two adjacent second curved patterns 120 is not too large, such that each of the touch electrodes 100 has the conductive lines 122a and 122b in a sufficient number, thereby preventing the impedance of the touch electrodes 100 from being increased. In the present embodiment, the length $P_{2x}$ of each of the second repeating portions 122 may be equal to the second pitch $P_{2y}$ between two adjacent second curved patterns 120, but the invention is not limited thereto. In other embodiments, the length $P_{2x}$ of each of the second repeating portions 122 may also be not equal to the second pitch $P_{2y}$ between two adjacent second curved patterns 120.

In the present embodiment, each of the conductive lines 122a and 122b has a line width W1. The increase of the width W1 of each of the conductive lines 122a and 122 may facilitate reducing the impedance of the touch electrodes 100, but overly wide conductive lines 122a and 122b may be easily perceived. Thus, the line width W1 of each of the conductive lines 122a and 122b should be designed within an adaptive range. For example, in the present embodiment, W1≤30 μm, but the invention is not limited thereto.

Figure 3:
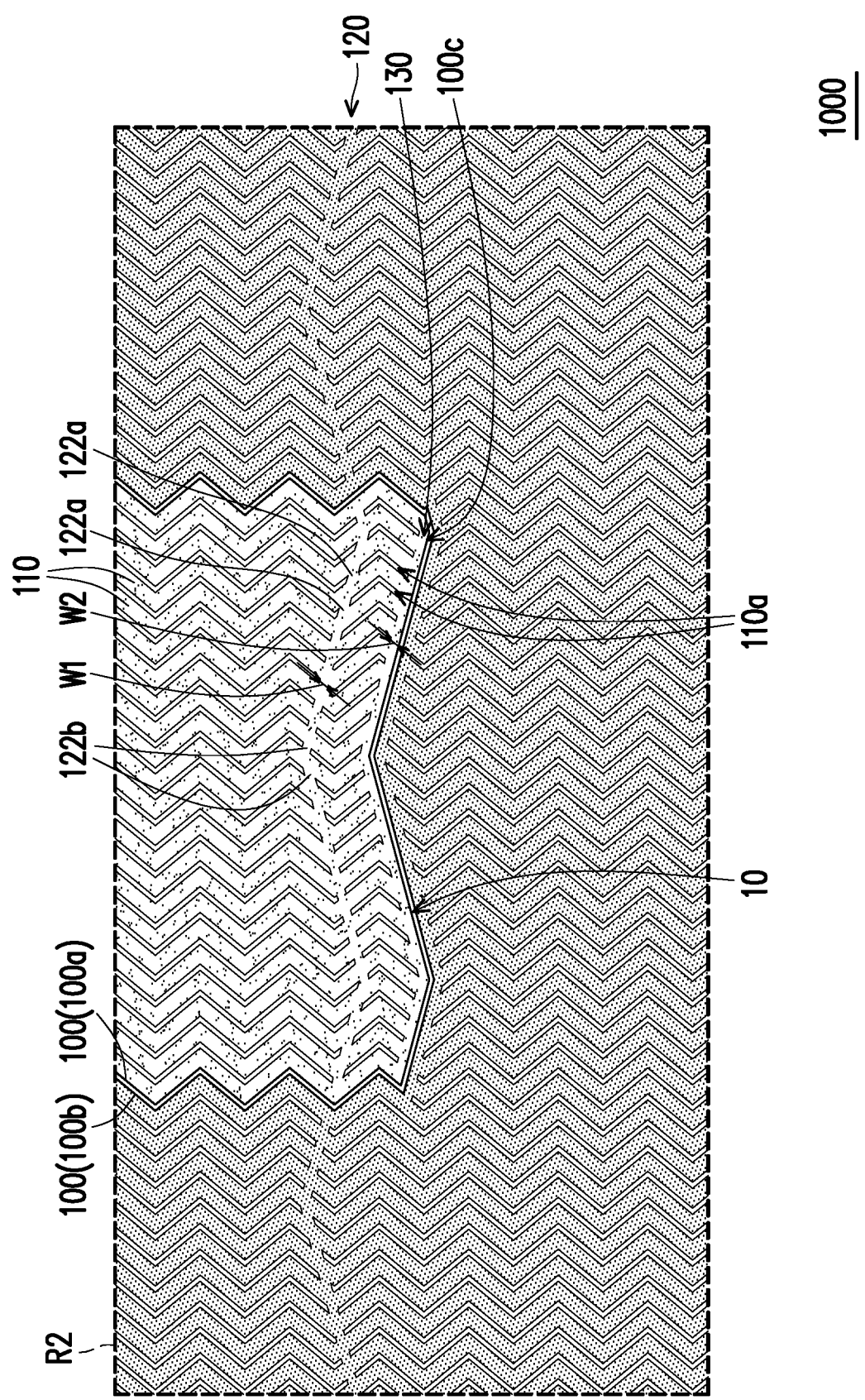
FIG. 3 is a schematic enlarged view of a part R2 of FIG. 1.

FIG. 3 is a schematic enlarged view of a part R2 of FIG. 1. Referring to FIG. 1 and FIG. 3, in the present embodiment, each of the touch electrodes 100 may selectively include a third curved pattern 130. The third curved pattern 130 is parallel to at least a part of the second curved patterns 120. The third curved pattern 130 defines an edge 100c of each of the touch electrodes 100 and is a continuous pattern. A plurality of curved slits 110a are surrounded by the first curved patterns 110, the conductive lines 122a and 122b and the third curved pattern 130. The curved slits 110a are closed. In the present embodiment, the third curved pattern 130 may have the same or similar shape of the second curved patterns 120, for example but not limited to the sawtooth shape. The third curved pattern 130 has a line width W2, in the present embodiment, the line width W2 of the third curved pattern 130 may be designed within an adaptive range. For example, 10 μm≤W2≤40 μm. Furthermore, in the present embodiment, the line width W2 of the third curved pattern 130 may be equal to the line width W1 of each of the conductive lines 122a and 122b of the second curved patterns 120. With the disposition of the third curved pattern 130, the human eyes may be prevented from perceiving gaps 10 between the adjacent touch electrodes 100 (or, in other words, the edge 100c of each of the touch electrodes 100), such that the visual effect of the touch device 1000 may be further enhanced. However, the invention is not limited thereto, and in another embodiment that is not shown, the touch electrodes may not include the third curved patterns 130, and the curved slits 110*a* between the first curved patterns 110 may also be opened.

In the present embodiment, the first curved patterns 110, the second curved patterns 120 (or referred to as the conductive lines 122*a* and 122*b*) and the third curved patterns 130 may selectively belong to a single film layer. For example, in the present embodiment, a material of the first curved patterns 110, the second curved patterns 120 and the third curved patterns 130 may include a transparent conductive material, for example, indium tin oxide, indium zinc oxide, aluminum tin oxide, aluminum zinc oxide, indium zinc germanium oxide, or other adaptive materials, or a stacked layer of at least two of the above-mentioned materials. However, the invention is not limited thereto, and in other embodiments, the first curved patterns 110 and the second curved patterns 120 or the third curved patterns 130 may also belong to different film layers.

Referring to FIG. 2, the first curved patterns 110 of the touch electrodes 100 define a plurality of curved slits 110*a*. In the present embodiment, corresponding conductive lines 122*a* or 122*b* of two adjacent second curved patterns 120 may be disposed in a single curved slit 110*a*. Furthermore, in the present embodiment, the conductive lines 122*a* and 122*b* of each of the second curved patterns 120 may be disposed in all the curved slits 110*a* of the touch electrodes 100. However, the invention is not limited thereto, and in other embodiments, the conductive lines 122*a* and 122*b* of the second curved patterns 120 may also be disposed in another adaptive manner, which will be described with reference to FIG. 4.

Figure 4:
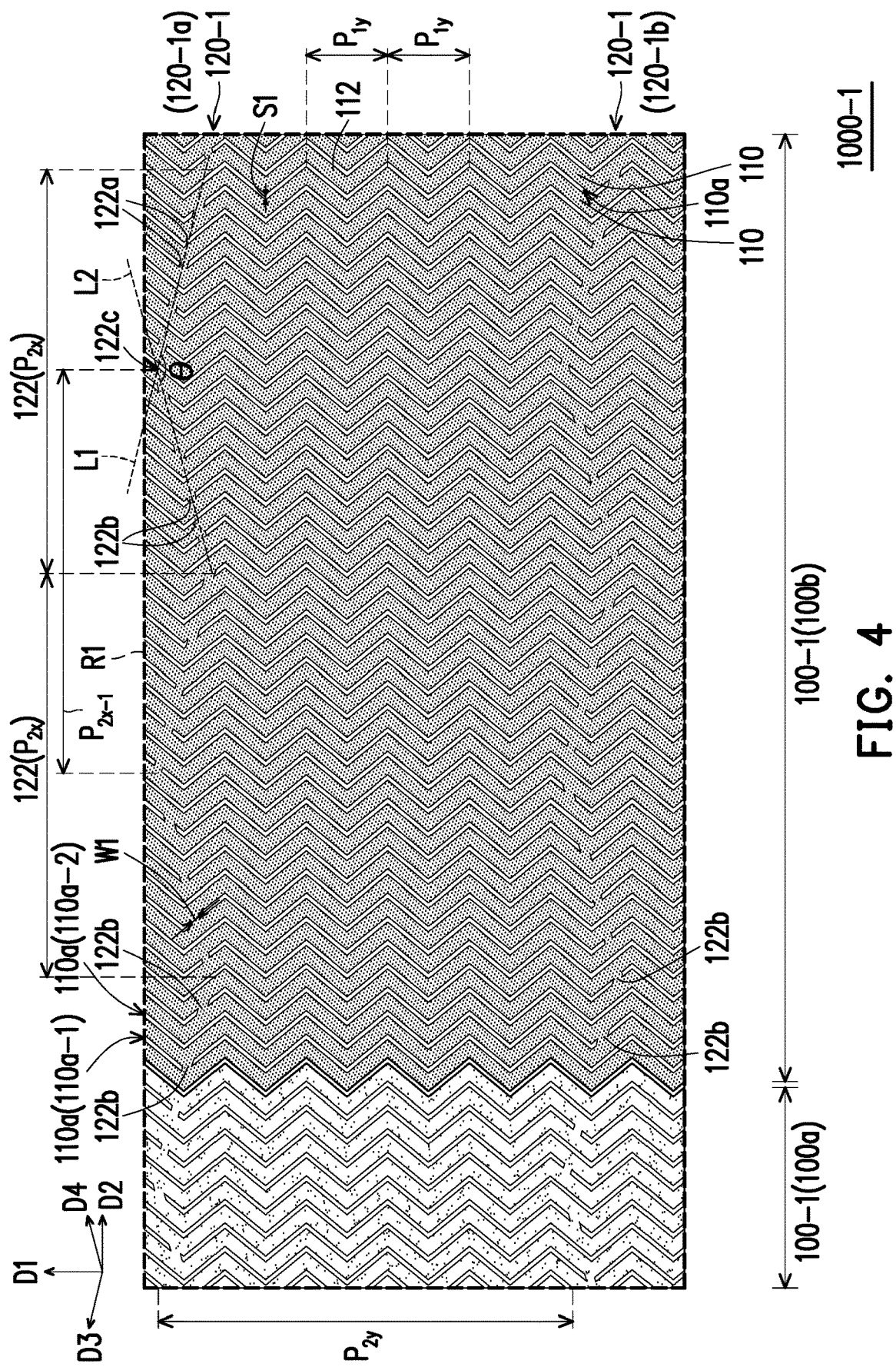
FIG. 4 is a schematic top view of a touch device according to another embodiment of the invention.

FIG. 4 is a schematic top view of a touch device according to another embodiment of the invention. Touch electrodes 100-1 illustrated in FIG. 4 are similar to the touch electrodes 100 illustrated in FIG. 1 and FIG. 2, and thus, the same or similar elements are represented by the same or similar reference numbers. Referring to FIG. 4, a touch device 1000-1 includes the touch electrodes 100-1 which are electrically separated from each other. Each of the touch electrodes 100-1 includes a plurality of first curved patterns 110 and a plurality of conductive lines 122*a* and 122*b*. The first curved patterns 110 are parallel to each other. A first pitch S1 is between two adjacent first curved patterns 110. Each of the conductive lines 122*a* and 122*b* is connected between two adjacent first curved patterns 110. The conductive lines 122*a* and 122*b* are arranged in a plurality of second curved patterns 120-1. The first curved patterns 110 intersect the second curved patterns 120-1.

Being different from the touch electrodes 100, the curved slits 110*a* of the touch electrodes 100-1 include a plurality of first curved slits 110*a*-1 and a plurality of second curved slits 110*a*-2 which are alternately arranged in the second direction D2. The conductive lines 122*a* and 122*b* of two adjacent second curved patterns 120-1 are respectively arranged in the first curved slits 110*a*-1 and the second curved slits 110*a*-2. In other words, the second curved patterns 120-1*a* are adjacent to the second curved patterns 120-1*b*, the conductive lines 122*a* and 122*b* of each of the second curved patterns 120-1*a* are arranged in the curved slits 110*a*-1 of odd numbers, and the conductive lines 122*a* and 122*b* of each of the second curved patterns 120-1*b* are arranged in the curved slits 110*a*-2 of even numbers. In brief, the conductive lines 122*a* and 122*b* of the two adjacent second curved patterns 120-1 are alternately arranged. In this way, the disposition of the conductive lines 122*a* and 122*b* may be better prevented from being perceived by the human eyes, thereby further enhancing a visual effect of the touch device 1000-1.

Figure 5:
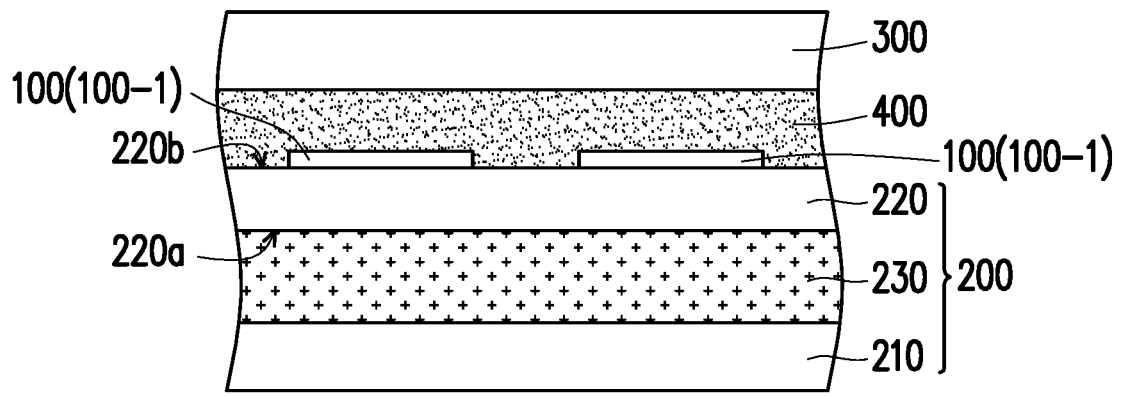
FIG. 5 is a schematic cross-sectional view of a touch device according to yet another embodiment of the invention.

FIG. 5 is a schematic cross-sectional view of a touch device according to yet another embodiment of the invention. Referring to FIG. 5, a touch device 1000-2 may further include a display panel 200. In the present embodiment, the touch electrodes 100 or the touch electrodes 100-1 described above may be directly disposed on an outer surface 220*b* of the display panel 200, so as to form an on-cell structure. Specifically, the display panel 200 includes a first substrate 210, a second substrate 220 and a display medium 230. The second substrate 220 is disposed opposite to the first substrate 210. The display medium 230 is located between the first substrate 210 and the second substrate 220. The second substrate 220 has an inner surface 220*a* facing the display medium 230 and the outer surface 220*b* with back facing to the display medium 230. The touch electrodes 100 or the touch electrodes 100-1 may be directly disposed on the outer surface 220*b* of the second substrate 220. The touch device 1000-2 may further include the protection substrate 300 covering the display panel 200. The protection substrate 300 may be connected with the display panel 200 by using an adhesive layer 400. However, the invention is not limited thereto, and in other embodiments, the touch electrodes 100 or the touch electrodes 100-1 may also be disposed at other positions to form a touch device of another type, which will be described with reference to FIG. 6 and FIG. 7.

Figure 6:
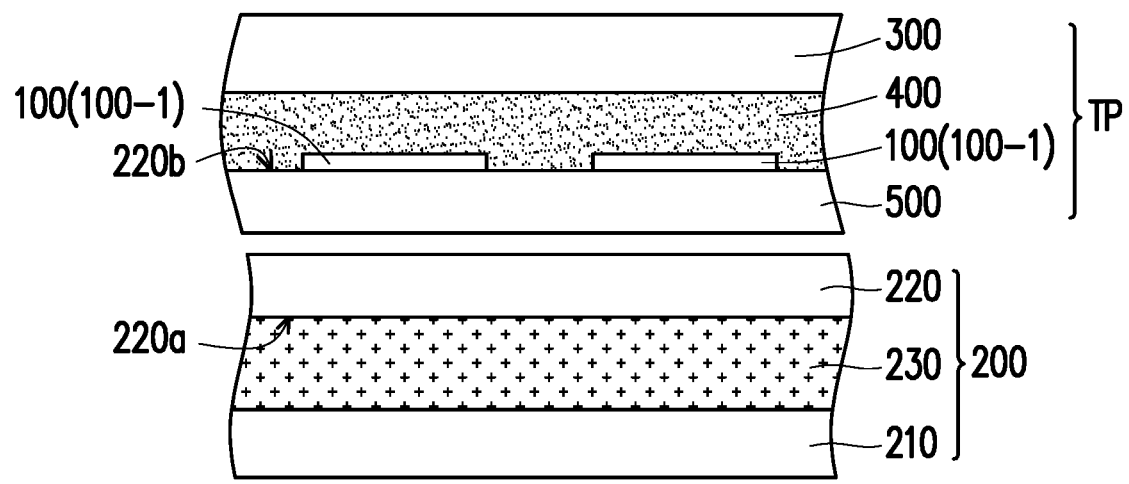
FIG. 6 is a schematic cross-sectional view of a touch device according to still another embodiment of the invention.

FIG. 6 is a schematic cross-sectional view of a touch device according to still another embodiment of the invention. Referring to FIG. 6, in the present embodiment, a touch device 1000-3 includes the protection substrate 300, a touch substrate 500 and the display panel 200. The touch electrodes 100 or the touch electrodes 100-1 described above may be disposed on the touch substrate 500. The protection substrate 300 covers the touch substrate 500. The touch electrodes 100 or the touch electrodes 100-1 are located between the protection substrate 300 and the touch substrate 500. The protection substrate 300 may be connected with the touch electrodes 100 or the touch electrodes 100-1 and the touch substrate 500 by using the adhesive layer 400. The protection substrate 300, the touch substrate 500 and the touch electrodes 100 or the touch electrodes 100-1 are formed on a touch panel TP. The touch panel TP may be disposed on the display panel 200, thereby forming an out-cell structure.

Figure 7:
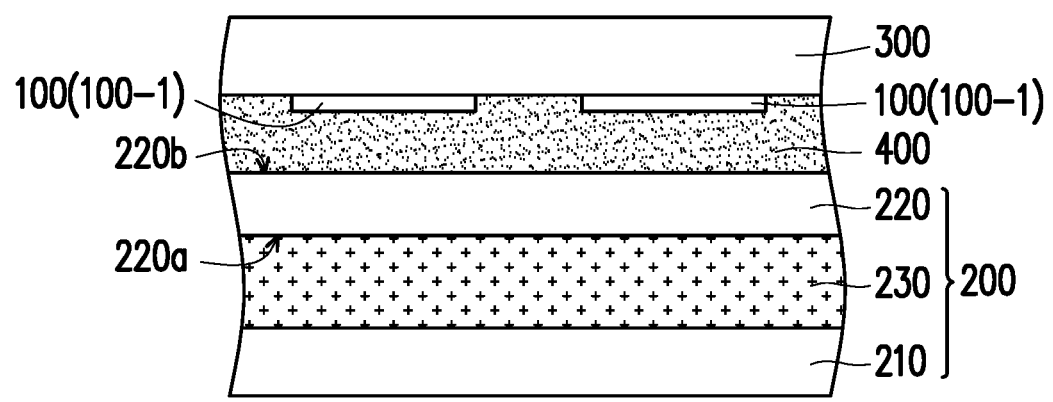
FIG. 7 is a schematic cross-sectional view of a touch device according to an embodiment of the invention.

FIG. 7 is a schematic cross-sectional view of a touch device according to an embodiment of the invention. Referring to FIG. 7, in the present embodiment, a touch device 1000-4 includes the touch electrodes 100 or the touch electrodes 100-1 and the protection substrate 300. The touch electrodes 100 or the touch electrodes 100-1 may be disposed on the protection substrate 300, thereby forming a one glass solution (OGS) structure. The touch device 1000-4 may further include the display panel 200. The protection substrate 300 and the touch electrodes 100 or the touch electrodes 100-1 thereon may be connected with the display panel 200 by using the adhesive layer 400, thereby forming a touch display device 1000-4.

In light of the foregoing, the touch device of one of the embodiments of the invention includes the touch electrodes which are electrically separated from each other. Each of the touch electrodes includes the first curved patterns and the conductive lines. The first curved patterns are parallel to each other. The first pitch is between two adjacent first curved patterns. Each of the conductive lines are connected between two adjacent first curved patterns. The conductive lines are arranged in the second curved patterns. The first curved patterns intersect the second curved patterns. In this way, the disposition of the conductive lines can be prevented from being perceived by the human eyes, such that the touch device can achieve preferable touch and visual effects.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch device, comprising:
a plurality of touch electrodes, electrically separated from each other, and each of the touch electrodes comprising:
a plurality of first curved patterns, being parallel to each other, and a first pitch being between two adjacent first curved patterns; and
a plurality of conductive lines, each of the conductive lines being connected between two adjacent first curved patterns, wherein the conductive lines are arranged in a plurality of second curved patterns, and the first curved patterns intersect the second curved patterns,
wherein each of the first curved patterns comprises a plurality of first repeating portions connected with each other, each of the first repeating portions has a first length $P_{1y}$ in a first direction, each of the second curved patterns comprises a plurality of second repeating portions, each of the second repeating portions has a second length $P_{2x}$ in a second direction intersecting the first direction, and $3 \cdot P_{1y} \leq P_{2x} \leq 6 \cdot P_{1y}$.

2. The touch device according to claim 1, wherein the conductive lines of each of the second curved patterns comprise:
a plurality of first conductive lines, arranged along a third direction; and
a plurality of second conductive lines, arranged along a fourth direction, wherein the third direction intersects the fourth direction, the third direction and the fourth direction have an included angle θ, and 130°≤θ≤170°.

3. The touch device according to claim 1,
wherein the second curved patterns are separated from each other in a first direction, the first curved patterns define a plurality of first curved slits and a plurality of second curved slits, and the first curved slits and the second curved slits are alternately arranged in a second direction intersecting the first direction, wherein the conductive lines of two adjacent second curved patterns are respectively arranged in the first curved slits and the second curved slits.

4. The touch device according to claim 1, wherein the second curved patterns are separated from each other in the first direction, and the first curved patterns define a plurality of curved slits, wherein corresponding conductive lines of two adjacent second curved patterns are arranged in a single curved slit.

5. The touch device according to claim 1, wherein each of the touch electrodes further comprises:
a third curved pattern, being parallel to the second curved patterns, wherein the third curved pattern defines an edge of each of the touch electrodes and is a continuous pattern.

6. The touch device according to claim 5, a plurality of closed curved slits are surrounded by the first curved patterns, the conductive lines and the third curved pattern.

7. The touch device according to claim 1, wherein each of the first curved patterns and/or each of the second curved patterns present a sawtooth shape.

8. The touch device according to claim 1, wherein each of the first curved patterns comprises a plurality of first repeating portions connected with each other, each of the first repeating portions has a first length $P_{1y}$ in a first direction, each of the second curved patterns comprises a plurality of second repeating portions, each of the second repeating portions has a second length $P_{2x}$ in a second direction intersecting the first direction, and each of the first repeating portions and/or each of the second repeating portions present a dog-leg shape.

9. A touch device, comprising:
a plurality of touch electrodes, electrically separated from each other, and each of the touch electrodes comprising:
a plurality of first curved patterns, being parallel to each other, and a first pitch being between two adjacent first curved patterns; and
a plurality of conductive lines, each of the conductive lines being connected between two adjacent first curved patterns, wherein the conductive lines are arranged in a plurality of second curved patterns, and the first curved patterns intersect the second curved patterns,
wherein each of the first curved patterns comprises a plurality of first repeating portions connected with each other, each of the first repeating portions has a first length $P_{1y}$ in a first direction, the second curved patterns are separated from each other in the first direction, a second pitch $P_{2y}$ is between two adjacent second curved patterns, and $3 \cdot P_{1y} \leq P_{2y} \leq 6 \cdot P_{1y}$.

10. The touch device according to claim 9, wherein the conductive lines of each of the second curved patterns comprise:
a plurality of first conductive lines, arranged along a third direction; and
a plurality of second conductive lines, arranged along a fourth direction, wherein the third direction intersects the fourth direction, the third direction and the fourth direction have an included angle θ, and 130°≤θ≤170°.

11. The touch device according to claim 9, wherein the second curved patterns are separated from each other in a first direction, the first curved patterns define a plurality of first curved slits and a plurality of second curved slits, and the first curved slits and the second curved slits are alternately arranged in a second direction intersecting the first direction, wherein the conductive lines of two adjacent second curved patterns are respectively arranged in the first curved slits and the second curved slits.

12. The touch device according to claim 9, the second curved patterns are separated from each other in the first direction, and the first curved patterns define a plurality of curved slits, wherein corresponding conductive lines of two adjacent second curved patterns are arranged in a single curved slit.

13. The touch device according to claim 9, wherein each of the touch electrodes further comprises:
a third curved pattern, being parallel to the second curved patterns, wherein the third curved pattern defines an edge of each of the touch electrodes and is a continuous pattern.

14. The touch device according to claim 13,
wherein a plurality of closed curved slits are surrounded by the first curved patterns, the conductive lines and the third curved pattern.

15. The touch device according to claim 9,
each of the first curved patterns and/or each of the second curved patterns present a sawtooth shape.

16. The touch device according to claim 9,
wherein each of the first curved patterns comprises a plurality of first repeating portions connected with each other, each of the first repeating portions has a first length $P1y$ in a first direction, each of the second curved patterns comprises a plurality of second repeating portions, each of the second repeating portions has a second length $P2x$ in a second direction intersecting the first direction, and each of the first repeating portions and/or each of the second repeating portions present a dog-leg shape.

17. A touch device, comprising:
a plurality of touch electrodes, electrically separated from each other, and each of the touch electrodes comprising:
   a plurality of first curved patterns, being parallel to each other, and a first pitch being between two adjacent first curved patterns; and
a plurality of conductive lines, each of the conductive lines being connected between two adjacent first curved patterns, wherein the conductive lines are arranged in a plurality of second curved patterns, and the first curved patterns intersect the second curved patterns,
wherein each of the conductive lines has a line width $W1$, and $W1<30$ μm.

18. The touch device according to claim 17, wherein the conductive lines of each of the second curved patterns comprise:
   a plurality of first conductive lines, arranged along a third direction; and
   a plurality of second conductive lines, arranged along a fourth direction, wherein the third direction intersects the fourth direction, the third direction and the fourth direction have an included angle $\theta$, and $130°\leq\theta\leq170°$.

19. The touch device according to claim 17, wherein the second curved patterns are separated from each other in a first direction, the first curved patterns define a plurality of first curved slits and a plurality of second curved slits, and the first curved slits and the second curved slits are alternately arranged in a second direction intersecting the first direction, wherein the conductive lines of two adjacent second curved patterns are respectively arranged in the first curved slits and the second curved slits.

20. The touch device according to claim 17, wherein a touch sensing manner of the touch device is capacitive sensing.

* * * * *